United States Patent
Shi et al.

(10) Patent No.: US 8,634,879 B2
(45) Date of Patent: Jan. 21, 2014

(54) METHODS AND SYSTEMS TO PROLONG MOBILE STATION OPERATION DURING LOW BATTERY POWER

(75) Inventors: Guangming Carl Shi, San Diego, CA (US); Kuo-Chun Lee, San Diego, CA (US); Steven D. Cheng, San Diego, CA (US); Tom Chin, San Diego, CA (US); Isaac Ta-yan Siu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 898 days.

(21) Appl. No.: 12/260,365

(22) Filed: Oct. 29, 2008

(65) Prior Publication Data

US 2010/0105449 A1  Apr. 29, 2010

(51) Int. Cl.
   *H04B 1/38* (2006.01)
(52) U.S. Cl.
   USPC .......................... 455/572; 455/573; 455/574
(58) Field of Classification Search
   USPC ........................................ 455/572, 573, 574
   See application file for complete search history.

(56) References Cited

U.S. PATENT DOCUMENTS

| | | | |
|---|---|---|---|
| 5,876,870 | A | 3/1999 | Kawabata |
| 6,463,307 | B1 | 10/2002 | Larsson et al. |
| 6,804,542 | B1 | 10/2004 | Haartsen |
| 8,284,707 | B2 | 10/2012 | Choi et al. |
| 2004/0072559 | A1 | 4/2004 | Kakumaru et al. |
| 2004/0180701 | A1 * | 9/2004 | Livet et al. ................. 455/574 |
| 2005/0181840 | A1 | 8/2005 | Banginwar et al. |
| 2005/0190710 | A1 * | 9/2005 | Chandra et al. ............. 370/311 |
| 2006/0128351 | A1 | 6/2006 | Hassan et al. |
| 2007/0072653 | A1 * | 3/2007 | Harris ........................... 455/574 |
| 2007/0298836 | A1 * | 12/2007 | Yanover .................... 455/552.1 |
| 2008/0009328 | A1 * | 1/2008 | Narasimha ................... 455/574 |
| 2008/0182567 | A1 | 7/2008 | Zhu et al. |
| 2008/0200220 | A1 | 8/2008 | Jackson |

FOREIGN PATENT DOCUMENTS

| | | |
|---|---|---|
| CN | 1212597 A | 3/1999 |
| CN | 1790931 A | 6/2006 |
| CN | 101237640 A | 8/2008 |
| EP | 1672468 A2 | 6/2006 |
| GB | 2328588 A | 2/1999 |
| JP | 10229646 A | 8/1998 |
| JP | 11127110 A | 5/1999 |
| JP | 2003179539 A | 6/2003 |
| JP | 2004128949 A | 4/2004 |
| JP | 2006050510 A | 2/2006 |
| JP | 2006203868 A | 8/2006 |
| JP | 2006352479 A | 12/2006 |
| JP | 2007534274 A | 11/2007 |
| KR | 100705449 B1 | 4/2007 |
| WO | WO03043210 A1 | 5/2003 |

OTHER PUBLICATIONS

International Search Report and Written Opinion—PCT/US2009/060644—ISAEPO—Jan. 27, 2010.

* cited by examiner

*Primary Examiner* — Manpreet Matharu
(74) *Attorney, Agent, or Firm* — Tyler J. Overall

(57) ABSTRACT

Certain embodiments of the present disclosure allow a mobile station to activate a sleep mode in order to reduce power consumption when the residual battery capacity is low. Certain embodiments of the present disclosure also provide techniques for adaptive power saving applied during an idle mode operation.

24 Claims, 9 Drawing Sheets

METHODS AND SYSTEMS TO PROLONG MOBILE STATION OPERATION DURING LOW BATTERY POWER

TECHNICAL FIELD

The present disclosure generally relates to communication, and more specifically to a method for reducing power consumption at a mobile station (MS) when residual battery capacity is low.

SUMMARY

Certain embodiments of the present disclosure provide a method for extending an operational time of a mobile station (MS). The method generally includes measuring a residual battery capacity of the MS, while the MS has one or more active transport connections, determining a most constrained maximum latency requirement of the active transport connections, and activating a sleep mode operation at the MS if the residual battery capacity is below a predefined threshold value, wherein a length S of a sleep window is selected such that S allows the MS to meet the most constrained maximum latency requirement of the active transport connections.

Certain embodiments of the present disclosure provide a method for extending an operational time of a mobile station (MS). The method generally includes measuring a residual battery capacity of the MS and entering an idle mode, wherein a paging cycle length of the idle mode is determined based on the residual battery capacity.

Certain embodiments of the present disclosure provide an apparatus for extending an operational time of a mobile station (MS). The apparatus generally includes logic for measuring a residual battery capacity of the MS, while the MS has one or more active transport connections, logic for determining a most constrained maximum latency requirement of the active transport connections, and logic for activating a sleep mode operation at the MS if the residual battery capacity is below a predefined threshold value, wherein a length S of a sleep window is selected such that S allows the MS to meet the most constrained maximum latency requirement of the active transport connections.

Certain embodiments of the present disclosure provide an apparatus for extending an operational time of a mobile station (MS). The apparatus generally includes logic for measuring a residual battery capacity of the MS and logic for entering an idle mode, wherein a paging cycle length of the idle mode is determined based on the residual battery capacity.

Certain embodiments of the present disclosure provide an apparatus for extending an operational time of a mobile station (MS). The apparatus generally includes means for measuring a residual battery capacity of the MS, while the MS has one or more active transport connections, means for determining a most constrained maximum latency requirement of the active transport connections, and means for activating a sleep mode operation at the MS if the residual battery capacity is below a predefined threshold value, wherein a length S of a sleep window is selected such that S allows the MS to meet the most constrained maximum latency requirement of the active transport connections.

Certain embodiments of the present disclosure provide an apparatus for extending an operational time of a mobile station (MS). The apparatus generally includes means for measuring a residual battery capacity of the MS and means for entering an idle mode, wherein a paging cycle length of the idle mode is determined based on the residual battery capacity.

Certain embodiments of the present disclosure provide a computer-program product for extending an operational time of a mobile station (MS), comprising a computer readable medium having instructions stored thereon, the instructions being executable by one or more processors. The instructions generally include instructions for measuring a residual battery capacity of the MS, while the MS has one or more active transport connections, instructions for determining a most constrained maximum latency requirement of the active transport connections, and instructions for activating a sleep mode operation at the MS if the residual battery capacity is below a predefined threshold value, wherein a length S of a sleep window is selected such that S allows the MS to meet the most constrained maximum latency requirement of the active transport connections.

Certain embodiments of the present disclosure provide a computer-program product for extending an operational time of a mobile station (MS), comprising a computer readable medium having instructions stored thereon, the instructions being executable by one or more processors. The instructions generally include instructions for measuring a residual battery capacity of the MS and instructions for entering an idle mode, wherein a paging cycle length of the idle mode is determined based on the residual battery capacity.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Figure 1:
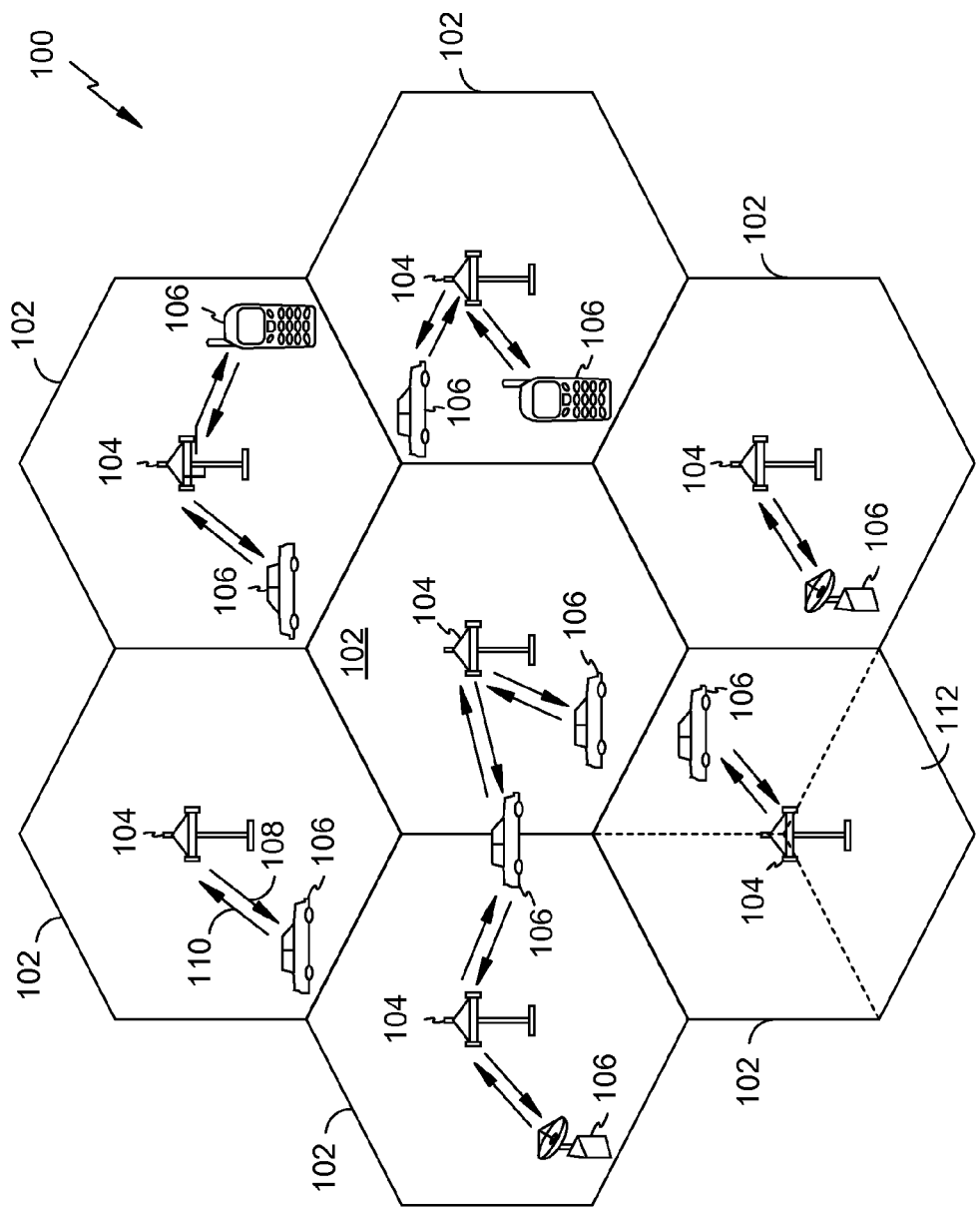
FIG. 1 illustrates an example wireless communication system, in accordance with certain embodiments of the present disclosure.

The word "exemplary" is used herein to mean "serving as an example, instance, or illustration." Any embodiment described herein as "exemplary" is not necessarily to be construed as preferred or advantageous over other embodiments.

The Worldwide Interoperability for Microwave Access (WiMAX) standard has specified the sleep mode in which a mobile station (MS) with a plurality of transport connections can negotiate with a serving base station (BS) to sleep and wake up in regular time intervals. The MS may enter the sleep mode after releasing all transport connections to periodically power down its hardware.

The WiMAX standard specifies three power saving class (PSC) types: the PSC type 1 that allows the MS to enter the sleep mode with exponentially increased sleep time duration until the maximal sleep time duration is reached, the PSC type 2 that allows the MS to enter the sleep mode with a constant sleep time duration, and the PSC type 3 that has only one single sleep time duration after which the MS exits the sleep mode. However, the WiMAX standard does not specify how to trigger the sleep mode. The present disclosure addresses this particular issue.

The battery capacity of the MS may only allow a limited time of operation. After the battery has drained up, the MS may need to power down its hardware and lose the connectivity and the service with the WiMAX network. Therefore, there is a need in the art for methods to reduce power consumption of the MS and to prolong its operation.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
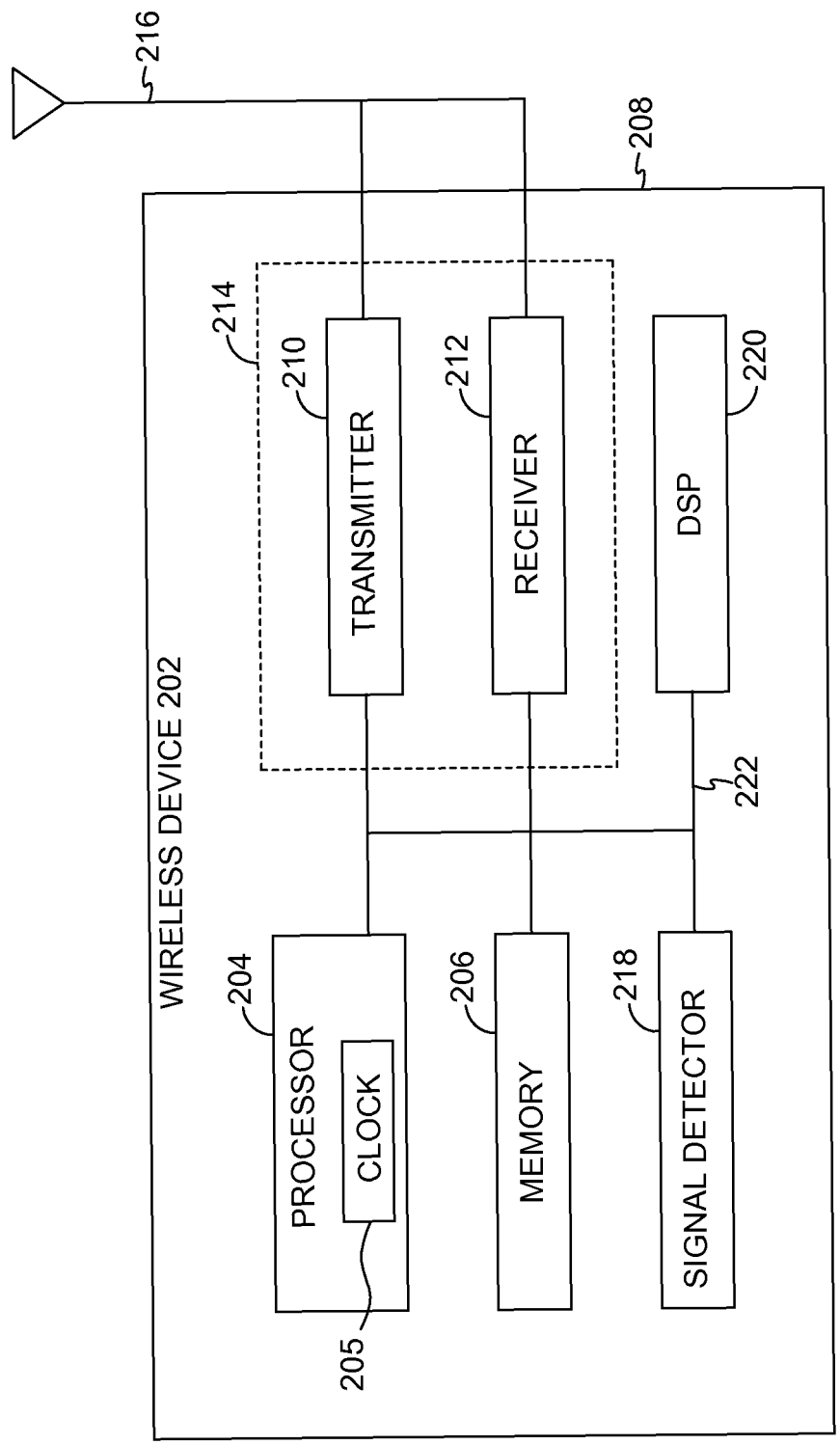
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
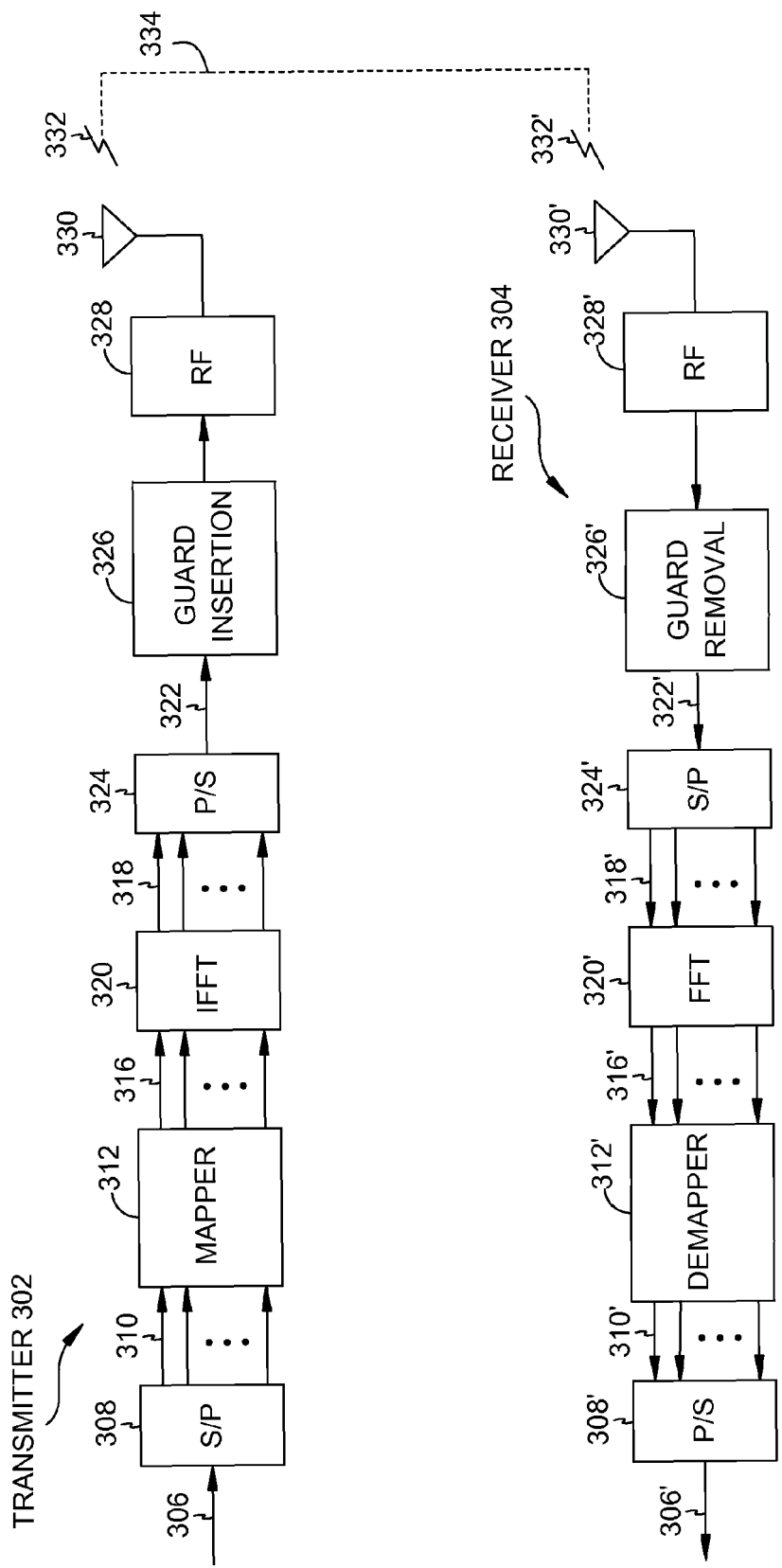
FIG. 3 illustrates an example transmitter and an example receiver that may be used within a wireless communication system in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into M parallel data streams 310.

The M parallel data streams 310 may then be provided as input to a mapper 312. The mapper 312 may map the M parallel data streams 310 onto M constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output M parallel symbol streams 316, each symbol stream 316 corresponding to one of the M orthogonal subcarriers of the inverse fast Fourier transform (IFFT) 320. These M parallel symbol streams 316 are represented in the frequency domain and may be converted into M parallel time domain sample streams 318 by an IFFT component 320.

A brief note about terminology will now be provided. M parallel modulations in the frequency domain are equal to M modulation symbols in the frequency domain, which are equal to M mapping and M-point IFFT in the frequency domain, which is equal to one (useful) OFDM symbol in the time domain, which is equal to M samples in the time domain. One OFDM symbol in the time domain, NS, is equal to NCP (the number of guard samples per OFDM symbol)+M (the number of useful samples per OFDM symbol).

The M parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the M parallel time-domain symbol streams 318', each of which corresponds to one of the M orthogonal subcarriers. A fast Fourier transform (FFT) component 320' may convert the M parallel time-domain symbol streams 318' into the frequency domain and output M parallel frequency-domain symbol streams 316'.

A demapper 312' may perform the inverse of the symbol mapping operation that was performed by the mapper 312 thereby outputting M parallel data streams 310'. A P/S converter 308' may combine the M parallel data streams 310' into a single data stream 306'. Ideally, this data stream 306' corresponds to the data 306 that was provided as input to the transmitter 302. Note that elements 308', 310', 312', 316', 320', 318' and 324' may all be found in a baseband processor 340'.

Exemplary Techniques to Prolong Mobile Station Operation Time

Certain embodiments of the present disclosure provide a method to activate the sleep mode at a mobile station in order to reduce its power consumption when a residual battery capacity is below a predefined threshold value. Certain embodiments of the present disclosure also provide an adaptive power saving method for an idle mode operation that prolongs operational time of the mobile station when the battery power is low.

Figure 4:
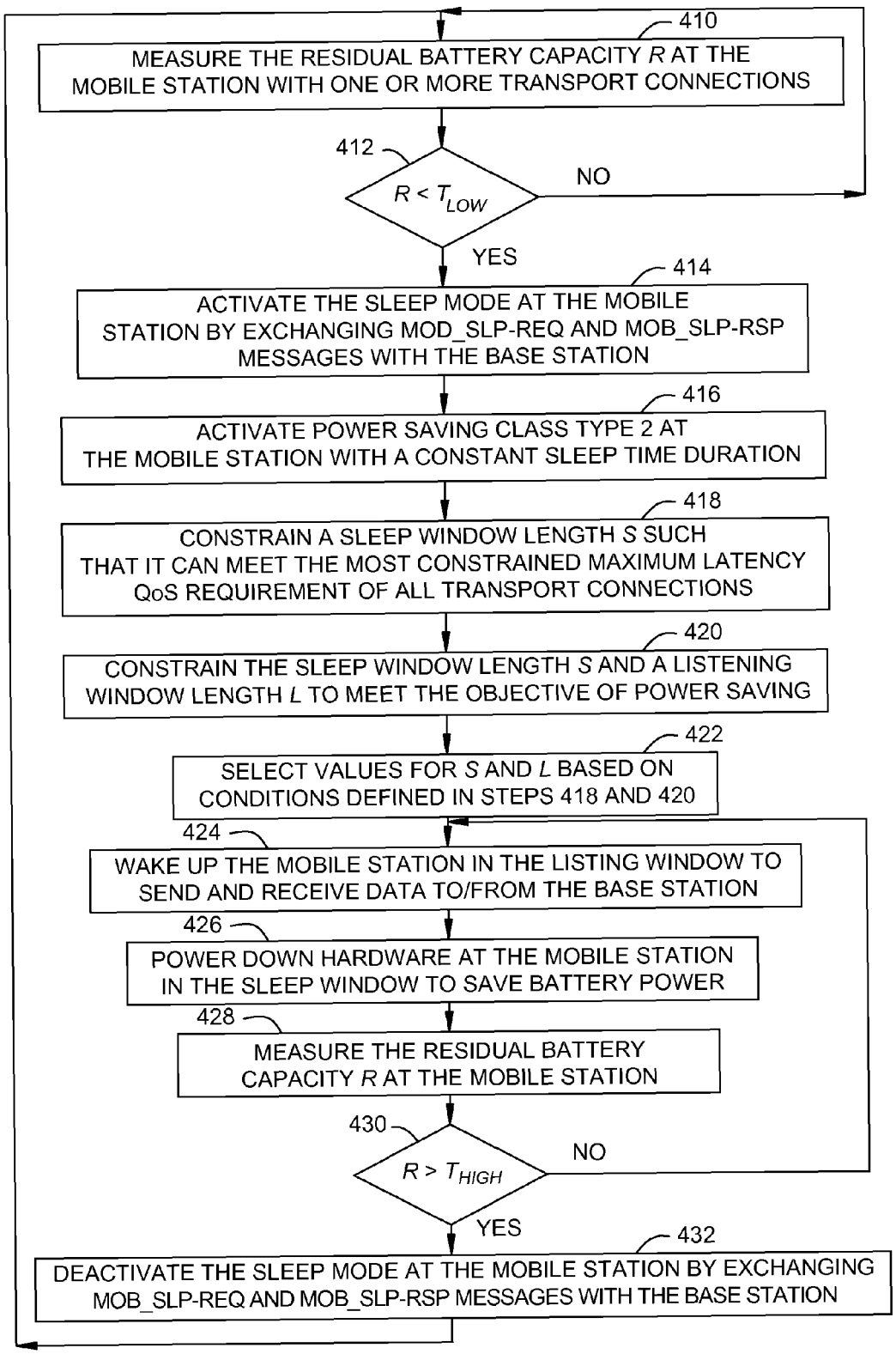
FIG. 4 shows a process of extending operational time of a mobile station during a low battery power in accordance with certain embodiments of the present disclosure.

Exemplary Techniques to Prolong Mobile Station Operation Time During Low Battery Power FIG. 4 illustrates example operations for extending an operation of a mobile station (MS) during a period when the battery power is low. At 410, the MS with one or more transport connections may measure the residual battery capacity. The concept of residual battery capacity is well known in the art. For example, a typical laptop computer provides this particular measurement function. The residual battery capacity R may be measured as a percentage of remaining capacity over the fully charged capacity.

When the residual battery capacity falls below a predefined threshold value TLOW, i.e. R<TLOW (decision step 412), the MS may start to activate the sleep mode operation, at 414, by exchanging a MOB_SLP-REQ message and a MOB_SLP-RSP message with a base station (BS) in order to activate the sleep mode and to reduce the power drainage.

For certain embodiments of the present disclosure the PSC type 2 may be supported. At 416, the MS may activate the power saving class (PSC) type 2 with a constant sleep time duration in order to maintain the service and connectivity with the BS while reducing the speed of battery drainage. The MS can map all connections to a single PSC class identification (ID).

Figure 5:
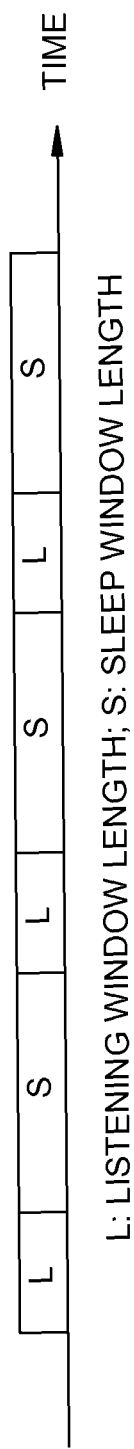
FIG. 5 illustrates a concept of the power saving class type 2 in accordance with certain embodiments of the present disclosure.

The sleep mode has two key parameters: a sleep window length S and a listening window length L, as it is illustrated in FIG. 5. At 418, the sleep window length may be constrained such that S can meet the most constrained maximum latency Quality of Service (QoS) requirement for all transport connections. For example, if there are two transport connections, one with the maximum latency t1, and the other one with the maximum latency t2>t1, then S should be less than min{t1, t2}=t1 in order to meet the QoS requirement while saving the battery power.

At 420, the length of the sleep window S and the length of the listening window L may be constrained such that to meet an objective for power saving that may be represented with the following ratio:

$$\alpha = \frac{L}{S+L} \quad (1)$$

If the objective for the battery power saving is more aggressive, then the factor α may be selected to have a small value. Otherwise, if the objective for the battery power is more conservative, then the factor α may be chosen with a larger value. At 422, the MS may select values for the sleep window length S and the listening window length L based on conditions defined in steps 418 and 420.

After being allowed to enter the sleep mode by the BS, the MS may wake up in the listening window to send and receive data to/from the BS, at 424. At 426, in the sleep window, the MS may power down its hardware in order to save the battery power. At 428, the MS may continue to measure its residual battery capacity R. The MS may exit the sleep mode when the battery is recharged to some extent. In particular, when the residual battery capacity rises above another predefined threshold value THIGH, i.e. R>THIGH (decision step 430), the MS may deactivate the sleep mode by exchanging the appropriate MOB_SLP-REQ and the MOB_SLP-RSP messages with the BS, at 432.

For certain embodiments of the present disclosure, the threshold values TLOW and THIGH may be chosen depending on an amount of data traffic communicated between the MS and the serving BS. If the amount of communicated data traffic is low, then the threshold value required to trigger the sleep mode may be lower, and vice versa if the amount of data traffic is high. For certain embodiments of the present disclosure, the threshold values TLOW and THIGH may be chosen based on a priority of running applications at the MS. If the priority of application is high, then the threshold values for the required residual battery capacity to enter and exit the sleep mode may be set to be low. On the other hand, low priority applications may be terminated sooner, while there is a higher level of the residual battery capacity.

For certain embodiments the MS may be allowed to enter the sleep mode once the residual battery capacity falls below the predefined threshold value while retaining transport connections. This particular feature of the MS may avoid a quick dropping of connections, and may prolong a service when the residual battery capacity is low. The MS may be allowed to return to a normal operation if the battery is recharged, for example, bringing the residual battery capacity above another predefined threshold value.

Exemplary Adaptive Power Savings for Idle Mode Operation

Figure 6:
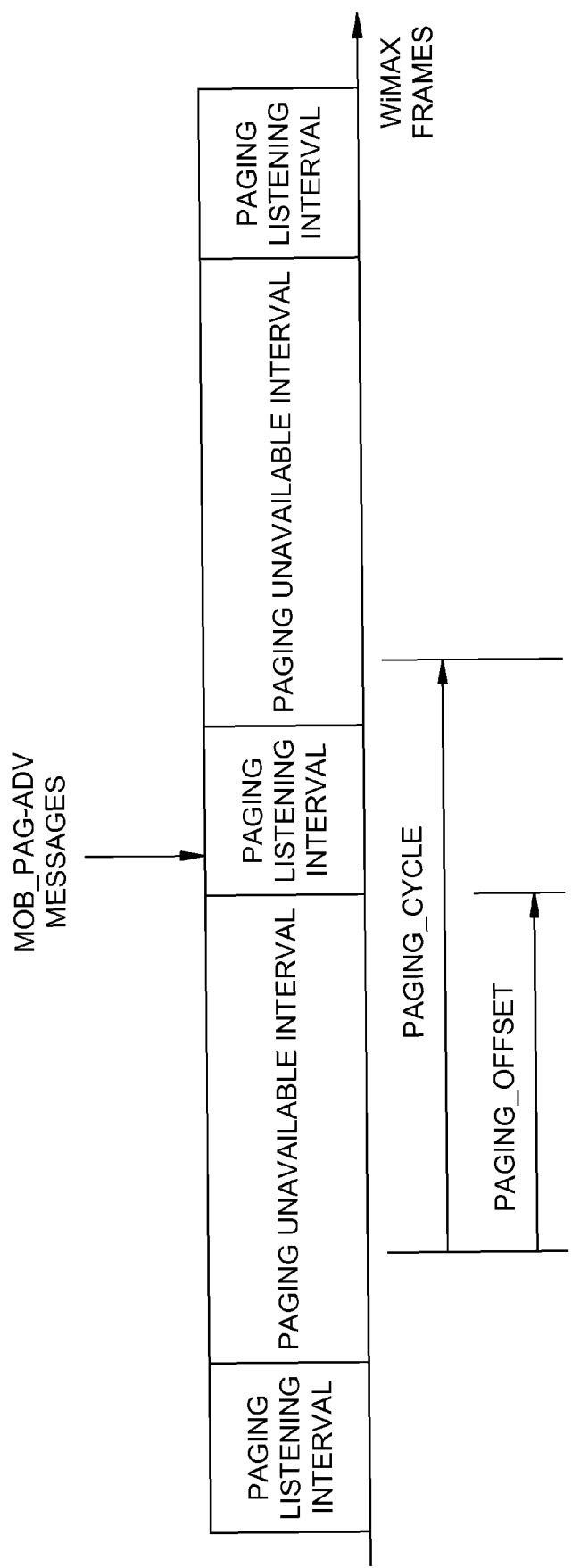
FIG. 6 illustrates a concept of paging listening intervals and unavailable (sleep) intervals in accordance with certain embodiments of the present disclosure.

An idle operational mode of an MS may consist of listening intervals and unavailable (sleep) intervals. FIG. 6 illustrates the concept of paging listening intervals and unavailable (sleep) intervals. The MS may start listening to a mobile paging advertisement message (a MOB_PAG-ADV message) during the recurrent paging listening intervals, starting from the frame number N that meets the following condition:

$$N \mod \text{Paging\_Cycle} = \text{Paging\_Offset} \quad (2)$$

On the other hand, the MS may enter the sleep mode in order to save battery power consumption during the recurrent paging unavailable intervals.

The parameter Paging_Cycle may be set by the MS and communicated to a base station (BS) as a part of a MOB_DREG-REQ message (a mobile de-registration request message). The parameter Paging_Offset may be set by the BS and communicated to the MS within a MOB_DREG-CMD message (a mobile de-registration command message).

The battery capacity of the MS may only allow a limited time of operation. After the battery has drained to a certain point, the MS may need to shut down its hardware and lose a service with the WiMAX wireless network. An adaptive power saving method is proposed in the present disclosure to further extend the operational time of the MS in the idle mode of operation during a low battery power.

Figure 7:
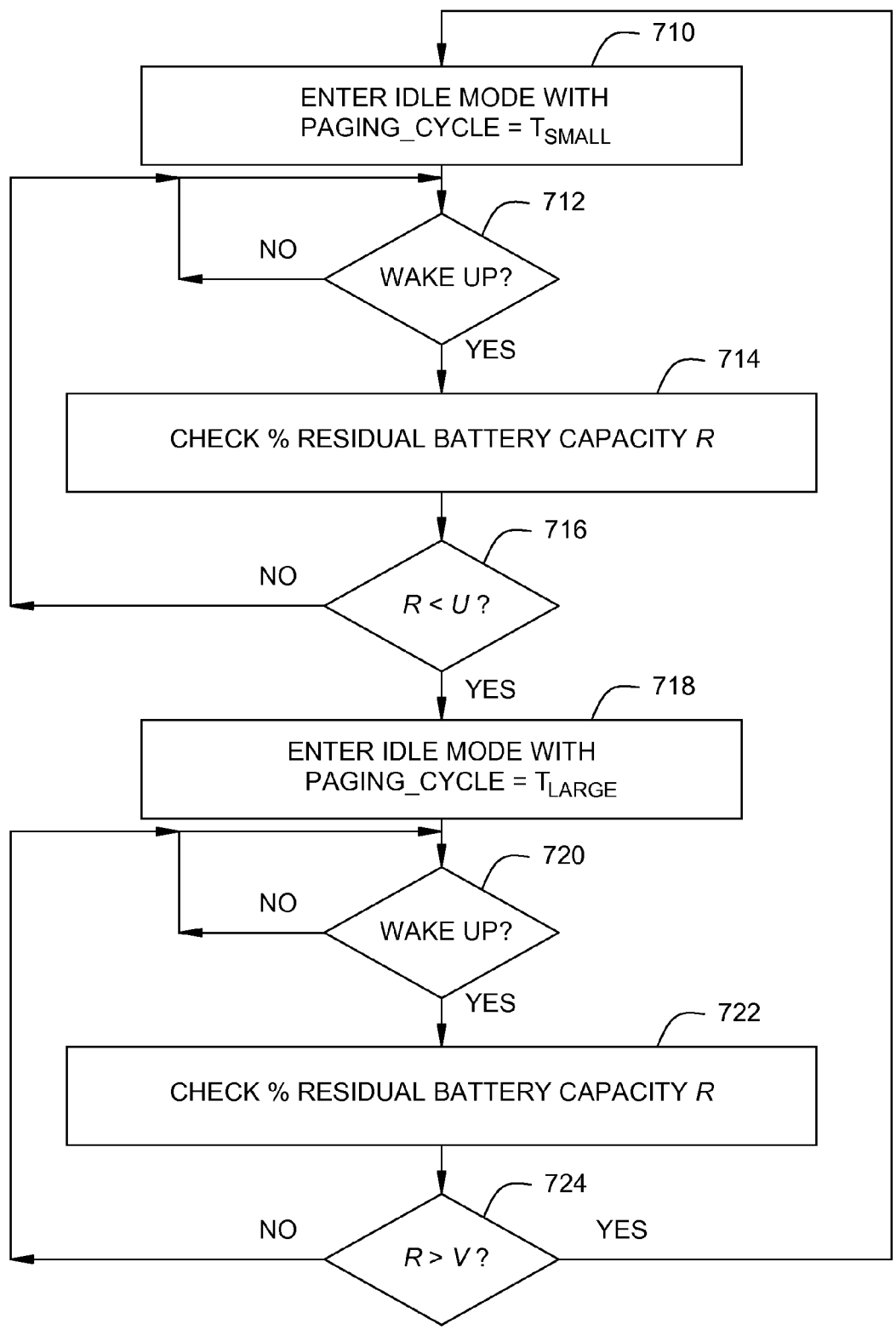
FIG. 7 shows a process of an adaptive power saving for an idle mode operation at the mobile station in accordance with certain embodiments of the present disclosure.

FIG. 7 shows a process of the adaptive power saving method that may be applied for the idle mode operation at the MS. At 710, the MS may start the standard idle mode with a parameter Paging_Cycle equal to TSMALL time duration representing a conservative approach since TSMALL may be short time duration.

At 712, the MS may wake up during the paging listening interval. Following that, the MS may check the residual battery capacity, at 714. The residual battery capacity R may be measured as a percentage of the remaining capacity over the fully charged capacity. When the residual battery capacity falls below a predefined threshold U, i.e. R<U (decision step 716), the MS may start an aggressive power saving operation. At 718, the MS may send the MOB_DREG-REQ message to the BS with the parameter Paging_Cycle equal to the time duration TLARGE (TLARGE>TSMALL), and may wait to receive the MOB_DREG-CMD message from the BS. Therefore, a new value of the idle mode parameter Paging_Cycle may allow the MS to sleep longer and save a larger amount of battery power when the remaining battery power is low.

After being granted with the new idle mode parameter by the BS, the MS may wake up in the less frequent paging listening intervals to send or receive data with the BS, at 720. The MS may power down its hardware in order to save battery power during paging unavailable intervals (i.e. during the sleep mode).

If the battery is recharged and the battery capacity is recovered to a certain level, then the MS may return to the standard idle mode operation. At 722, the MS may check the percentage value of the residual battery capacity R. In particular, when the residual battery capacity R rises above another predefined threshold value V (decision step 724), i.e. R>V (normally V≥U), the MS may send the MOB_DREG-REQ message to the BS with the parameter Paging_Cycle=$T_{SMALL}$ and wait to receive the MOB_DREG-CMD message from the BS before entering the idle mode with the conservative value of parameter Paging_Cycle.

To be able to send the MOB_DREG-REQ message for updating the value of parameter Paging_Cycle, for certain embodiments of the present disclosure the MS may need to perform an initial ranging request or a network reentry in order to receive Basic Connection Identifier (Basic CID) and Primary Management CID. For certain embodiments of the present disclosure, before sending the Media Access Control (MAC) management message, the MS may need to send a bandwidth ranging message in order to request an uplink (UL) data grant.

According to adaptive method presented herein, the MS may save battery power more aggressively when the residual battery capacity is low. As presented herein, the MS may adapt the controlling parameters of the idle mode operation (such as the length of the paging cycle) to the remaining battery capacity.

Figure 4A:
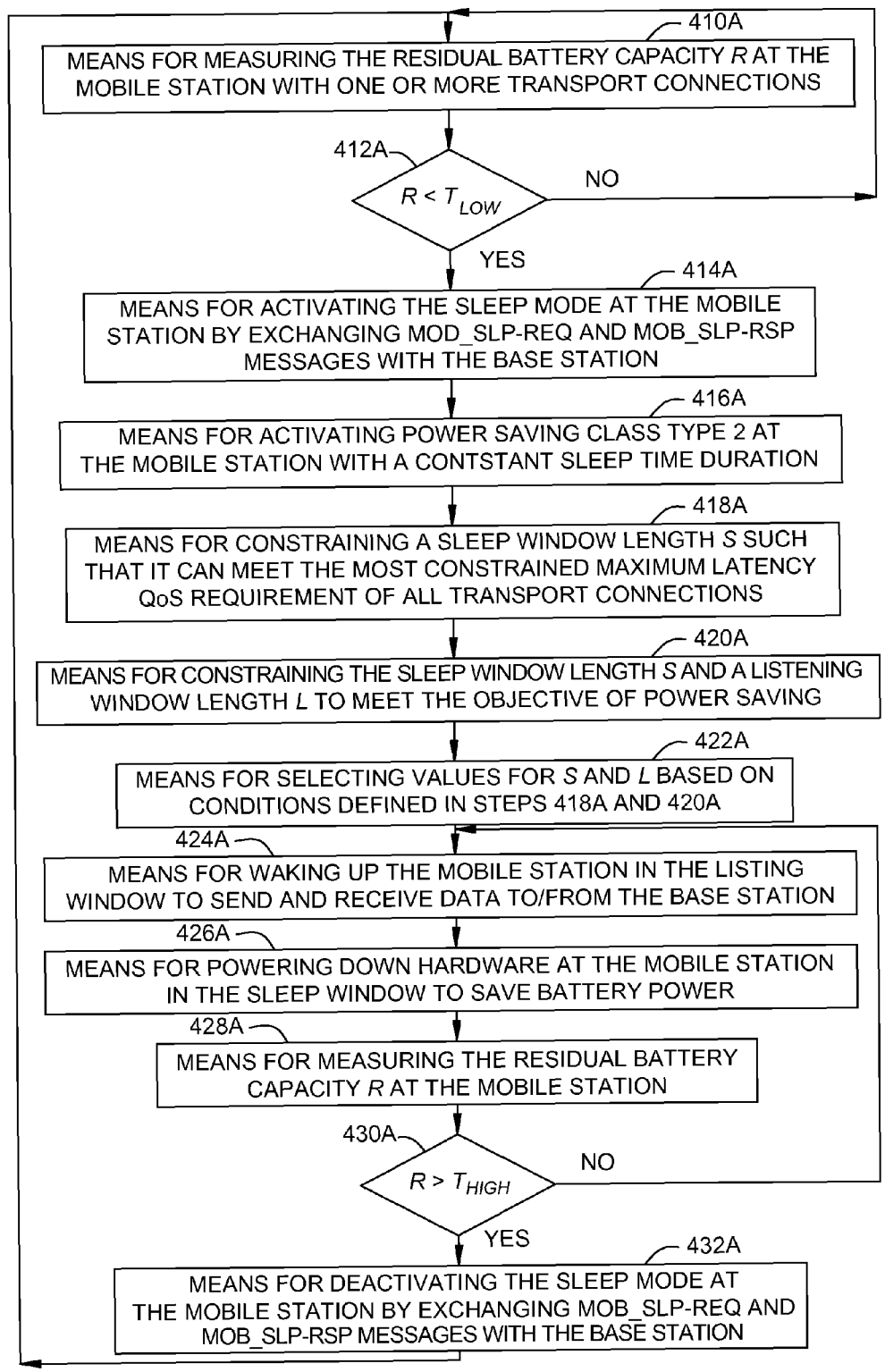
FIG. 4A illustrates example components capable of performing the operations illustrated in FIG. 4.
Figure 7A:
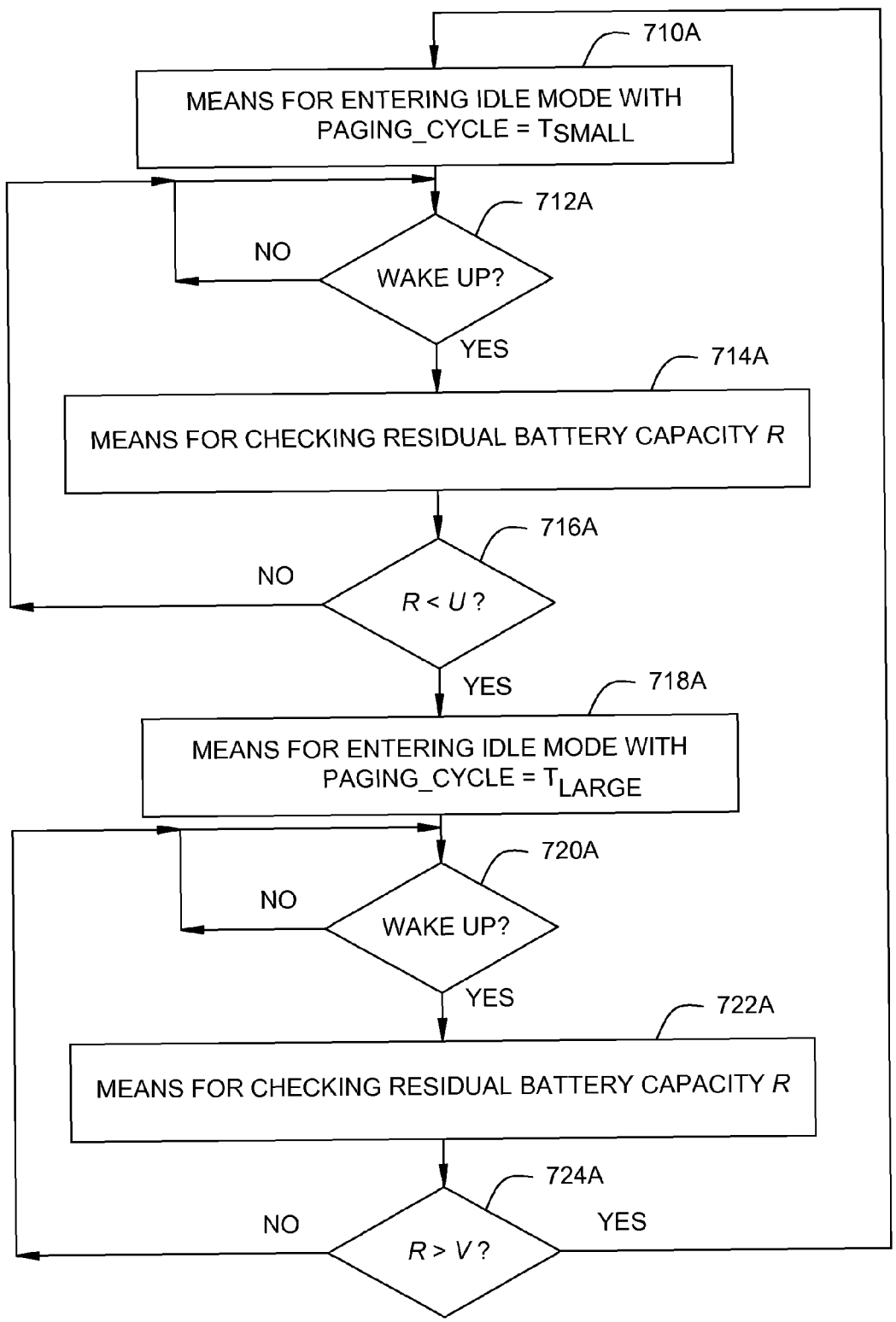
FIG. 7A illustrates example components capable of performing the operations illustrated in FIG. 7.

The various operations of methods described above may be performed by various hardware and/or software component(s) and/or module(s) corresponding to means-plus-function blocks illustrated in the Figures. For example, blocks 410-432 illustrated in FIG. 4 correspond to means-plus-function blocks 410A-432A illustrated in FIG. 4A. Similarly, blocks 710-724 illustrated in FIG. 7 correspond to means-plus-function blocks 710A-724A illustrated in FIG. 7A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for extending an operational time of a mobile station (MS), comprising:
   measuring a residual battery capacity of the MS, while the MS has one or more active transport connections;
   determining, at the MS, a most constrained maximum latency requirement of the one or more active transport connections; and
   activating a sleep mode operation at the MS if the residual battery capacity is below a predefined threshold value, wherein a length S of a sleep window of the sleep mode is selected such that S allows the MS to meet the most constrained maximum latency requirement of the one or more active transport connections, and wherein S and a length L of a listening window of the sleep mode are also selected to achieve a power savings metric determined based on a ratio of L to the sum of S and L.

2. The method of claim 1 wherein the residual battery capacity is measured as a percentage of remaining capacity relative to a fully charged capacity.

3. The method of claim 1 wherein the activating a sleep mode operation comprises activating a power savings class type 2 with a constant length sleep window.

4. The method of claim 1 wherein the threshold value may be chosen based on an amount of data traffic communicated between the MS and a serving BS.

5. The method of claim 1 wherein the threshold value may be chosen based on a priority of a running application.

6. The method of claim 1 further comprising:
   exiting the sleep mode if the residual battery capacity is higher than another predefined threshold.

7. An apparatus for extending an operational time of a mobile station (MS), comprising:
   logic for measuring a residual battery capacity of the MS, while the MS has one or more active transport connections;
   logic for determining, at the MS, a most constrained maximum latency requirement of the one or more active transport connections; and
   logic for activating a sleep mode operation at the MS if the residual battery capacity is below a predefined threshold value, wherein a length S of a sleep window of the sleep mode is selected such that S allows the MS to meet the most constrained maximum latency requirement of the one or more active transport connections, and wherein S and a length L of a listening window of the sleep mode are also selected to achieve a power savings metric determined based on a ratio of L to the sum of S and L.

8. The apparatus of claim 7 wherein the residual battery capacity is measured as a percentage of remaining capacity relative to a fully charged capacity.

9. The apparatus of claim 7 wherein the logic for activating a sleep mode operation comprises logic for activating a power savings class type 2 with a constant length sleep window.

10. The apparatus of claim 7 wherein the threshold value may be chosen based on an amount of data traffic communicated between the MS and a serving BS.

11. The apparatus of claim 7 wherein the threshold value may be chosen based on a priority of a running application.

12. The apparatus of claim 7 further comprising:
logic for exiting the sleep mode if the residual battery capacity is higher than another predefined threshold.

13. An apparatus for extending an operational time of a mobile station (MS), comprising:
means for measuring a residual battery capacity of the MS, while the MS has one or more active transport connections;
means for determining, at the MS, a most constrained maximum latency requirement of the one or more active transport connections; and
means for activating a sleep mode operation at the MS if the residual battery capacity is below a predefined threshold value, wherein a length S of a sleep window of the sleep mode is selected such that S allows the MS to meet the most constrained maximum latency requirement of the one or more active transport connections, and wherein S and a length L of a listening window of the sleep mode are also selected to achieve a power savings metric determined based on a ratio of L to the sum of S and L.

14. The apparatus of claim 13 wherein the residual battery capacity is measured as a percentage of remaining capacity relative to a fully charged capacity.

15. The apparatus of claim 13 wherein the means for activating a sleep mode operation comprises means for activating a power savings class type 2 with a constant length sleep window.

16. The apparatus of claim 13 wherein the threshold value may be chosen based on an amount of data traffic communicated between the MS and a serving BS.

17. The apparatus of claim 13 wherein the threshold value may be chosen based on a priority of a running application.

18. The apparatus of claim 13 further comprising:
means for exiting the sleep mode if the residual battery capacity is higher than another predefined threshold.

19. A computer-program product for extending an operational time of a mobile station (MS), comprising a non-transitory computer readable medium having instructions stored thereon, the instructions being executable by one or more processors and the instructions comprising:
instructions for measuring a residual battery capacity of the MS, while the MS has one or more active transport connections;
instructions for determining, at the MS, a most constrained maximum latency requirement of the one or more active transport connections; and
instructions for activating a sleep mode operation at the MS if the residual battery capacity is below a predefined threshold value, wherein a length S of a sleep window of the sleep mode is selected such that S allows the MS to meet the most constrained maximum latency requirement of the one or more active transport connections, and wherein S and a length L of a listening window of the sleep mode are also selected to achieve a power savings metric determined based on a ratio of L to the sum of S and L.

20. The computer-program product of claim 19 wherein the residual battery capacity is measured as a percentage of remaining capacity relative to a fully charged capacity.

21. The computer-program product of claim 19 wherein the instructions for activating a sleep mode operation comprises instructions for activating a power savings class type 2 with a constant length sleep window.

22. The computer-program product of claim 19 wherein the threshold value may be chosen based on an amount of data traffic communicated between the MS and a serving BS.

23. The computer-program product of claim 19 wherein the threshold value may be chosen based on a priority of a running application.

24. The computer-program product of claim 19, wherein the instructions further comprise:
instructions for exiting the sleep mode if the residual battery capacity is higher than another predefined threshold.

* * * * *